(12) United States Patent
Zang et al.

(10) Patent No.: US 8,441,432 B2
(45) Date of Patent: *May 14, 2013

(54) DISPLAY CELL STRUCTURE AND ELECTRODE PROTECTING LAYER COMPOSITIONS

(75) Inventors: HongMei Zang, Sunnyvale, CA (US); Kangtai Ren, Geneva, IL (US); Jack Hou, Fremont, CA (US); Wanheng Wang, Pleasanton, CA (US); Chia-Pu Chang, Saratoga, CA (US); Jing-Den Chen, Dayton, OH (US); Yajuan Chen, Fremont, CA (US); Fei Wang, Fremont, CA (US); Yi-Shung Chaug, Cupertino, CA (US); Quan Gu, Alameda, CA (US); Hui Chen, Santa Clara, CA (US)

(73) Assignee: SiPix Imaging, Inc., Fremont, CA (US)

(*) Notice: Subject to any disclaimer, the term of this patent is extended or adjusted under 35 U.S.C. 154(b) by 156 days.

This patent is subject to a terminal disclaimer.

(21) Appl. No.: 13/007,139

(22) Filed: Jan. 14, 2011

(65) Prior Publication Data

US 2011/0157682 A1      Jun. 30, 2011

Related U.S. Application Data

(63) Continuation-in-part of application No. 11/517,810, filed on Sep. 7, 2006, now Pat. No. 7,880,958.

(60) Provisional application No. 60/720,188, filed on Sep. 23, 2005, provisional application No. 60/762,821, filed on Jan. 26, 2006.

(51) Int. Cl.
*G02F 1/167* (2006.01)
*G02B 26/00* (2006.01)

(52) U.S. Cl.
USPC ............ 345/107; 359/296; 359/321; 428/1.3; 428/1.5

(58) Field of Classification Search .................. 345/107; 359/296, 321; 428/1.3, 1.5
See application file for complete search history.

(56) References Cited

U.S. PATENT DOCUMENTS 3,612,758 A   10/1971   Evans et al.
5,930,026 A   7/1999    Jacobson et al.
(Continued)

FOREIGN PATENT DOCUMENTS

EP   0 578 471    1/1994
JP   04-037715    2/1992
(Continued)

OTHER PUBLICATIONS

Allen, K. (Oct. 2003). Electrophoretics Fulfilled. *Emerging Displays Review: Emerging Display Technologies*, Monthly Report—Oct. 2003, 9-14.

(Continued)

*Primary Examiner* — Shean C Wu
(74) *Attorney, Agent, or Firm* — Perkins Coie LLP.

(57) ABSTRACT

The invention is directed to compositions of display cell structure and electrode protecting layers for improving the performance of display devices. The composition comprises a polar oligomeric or polymeric material having a glass transition temperature below about 100° C., and the resulting display cells or electrode protecting layer have an average crosslinking density of below about 1 crosslink point per 80 Dalton molecular weight.

20 Claims, 4 Drawing Sheets

U.S. PATENT DOCUMENTS

| | | | |
|---|---|---|---|
| 5,961,804 | A | 10/1999 | Jacobson et al. |
| 6,657,772 | B2 | 12/2003 | Loxley |
| 6,672,921 | B1 | 1/2004 | Liang et al. |
| 6,788,449 | B2 | 9/2004 | Liang et al. |
| 6,833,943 | B2 | 12/2004 | Liang et al. |
| 6,870,662 | B2 | 3/2005 | Tseng et al. |
| 6,930,818 | B1 | 8/2005 | Liang et al. |
| 6,933,098 | B2 | 8/2005 | Chan-Park et al. |
| 7,504,050 | B2 | 3/2009 | Weng et al. |
| 7,560,004 | B2 | 7/2009 | Pereira et al. |
| 7,564,614 | B2 | 7/2009 | Chen et al. |
| 7,880,958 | B2 * | 2/2011 | Zang et al. ............... 359/321 |
| 2003/0032729 | A1 | 2/2003 | Takai et al. |
| 2004/0085619 | A1 | 5/2004 | Wu et al. |
| 2004/0219306 | A1 | 11/2004 | Wang et al. |

FOREIGN PATENT DOCUMENTS

| | | |
|---|---|---|
| JP | 11-183912 | 7/1999 |
| JP | 2002-031807 | 1/2002 |
| WO | WO 00/38001 | 6/2000 |
| WO | WO 01/67170 | 9/2001 |
| WO | WO 02/01281 | 1/2002 |
| WO | WO 02/065215 | 8/2002 |
| WO | WO 03/007067 | 1/2003 |
| WO | WO 03/019280 | 3/2003 |
| WO | WO 03/091796 | 11/2003 |
| WO | WO 2005/054933 | 6/2005 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Application and the Dynamics of Companies. *TRI*. 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C., & Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Application*. Presentation conducted at USDC 4th Annual Flexible Display Conference 2005.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper, presented at the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, H.M. and Li, P. (Jun. 2006) Roll-to-Roll Manufacturing Process for Full Color Electrophoretic film. *SID Digest*, pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging*, SPIE vol. 5289, 102-108.

Zang, H.M. & Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Sep. 2006) *Monochrome and Area Color Microcup® PDs by Roll-to-Roll Manufacturing Process*. Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS'06 International Congress of Imaging Science Final Program and Proceedings*, pp. 362-365.

* cited by examiner

DISPLAY CELL STRUCTURE AND ELECTRODE PROTECTING LAYER COMPOSITIONS

This application is a continuation-in-part of U.S. application Ser. No. 11/517,810, filed Sep. 7, 2006, now U.S. Pat. No. 7,880,958 which claims priority to U.S. Provisional Application Nos. 60/720,188, filed Sep. 23, 2005, and 60/762,821, filed Jan. 26, 2006. The contents of the above-identified applications are incorporated herein by reference in their entirety.

BACKGROUND OF THE INVENTION

1. Field of the Invention

The invention is directed to compositions of display cell structure and electrode protecting layers for improving the performance of display devices.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

An improved EPD technology was disclosed in U.S. Pat. No. 6,930,818 (corresponding to WO 01/67170), U.S. Pat. No. 6,672,921 (corresponding to WO 02/01281) and U.S. Pat. No. 6,933,098 (corresponding to WO02/65215), all of which are incorporated herein by reference in their entirety. The improved EPD cells may be prepared by a lithographic process or by microembossing a layer of a radiation curable composition coated on a first substrate layer to form microcups of well-defined shape, size and aspect ratio. The microcups are then filled with an electrophoretic fluid and sealed with a sealing layer. A second substrate layer is laminated over the filled and sealed microcups, preferably with an adhesive layer.

The microcapsule type EPD as described in U.S. Pat. Nos. 5,961,804 and 5,930,026 has a substantially two dimensional arrangement of microcapsules each having therein an electrophoretic fluid of a dielectric solvent and a suspension of charged pigment particles that visually contrast with the dielectric solvent. The microcapsules may be immobilized within a transparent matrix or binder that is itself sandwiched between two electrodes.

For all types of electrophoretic displays, image bistability is one of the most important issues. However in certain cases, the image bistability may degrade due to reverse bias. The term "reverse bias" is commonly used to describe a voltage induced by the capacitor discharge effect from a dielectric material used in an electrophoretic display. The polarity of the reverse bias is opposite of that of the applied driving voltage and therefore the reverse bias may cause the particles to move in a direction opposite from the intended direction. As a result, the display may have inferior image contrast and bistability. An example of reverse bias is illustrated in FIG. 1. The voltage sensed by the electrophoretic fluid when the applied voltage drops from +40V to 0V is referred to as the "reverse bias" and its polarity is negative (opposite of the applied voltage).

The dielectric materials referred to above are usually used for the formation of the display cell structure and thin polymer layer(s) between the electrode plates and the electrophoretic fluid. For the microcapsule type displays, the polymer layer may be an adhesive layer, the microcapsule wall, the polymer matrix in which the microcapsule-based display cells are dispersed, or a tie layer. For the microcup type displays, the polymer layer may be an adhesive layer, the sealing layer, a layer between the microcups and the bottom electrode plate (i.e., the primer layer), or a tie layer. The term "polymer layer" referred to herein may also be referred to as an "electrode protecting layer" or a "dielectric layer", in the context of the present application.

In order to achieve desired electrical properties of an electrophoretic display, the resistivities of the display cell structure and the polymer layer(s) of the display must be controlled. The basic principle of achieving the desired electrical properties of an electrophoretic display involves increasing the resistivity of the electrophoretic fluid and/or lowering the resistivities of the display cell structure and/or the polymer layer(s). While the room for increasing the resistivity of the electrophoretic fluid is limited, lowering the resistivities of the display cell structure and/or the polymer layer(s) appears to be a more promising option.

U.S. Pat. No. 6,657,772 discloses that the volume resistivity of an adhesive layer can be decreased by blending a conductive filler into an adhesive composition. However, it also acknowledges that there are great difficulties in adopting this approach to achieve the volume resistivity of about $10^{10}$ ohm cm required for an adhesive layer used in an electrophoretic display. The reference further states that the volume resistivity of the conductive filler should not be about two orders of magnitude less than the intended volume resistivity of the final blend and it claims that an adhesive layer that has a volume resistivity in the range of about $10^9$ to about $10^{11}$ ohm cm may only be achieved by a mixture of an adhesive material having a volume resistivity of at least about $5 \times 10^{11}$ ohm cm and a filler having a volume resistivity not less than about $10^7$ ohm cm.

Most conductive fillers which may be incorporated into a dielectric material are not transparent and require tedious grinding or milling to be uniformly dispersed into the composition for the display cell structure and polymer layer(s). Aggregation of the filler particles may also results in an undesirable effect such as poor image uniformity, mottling or, sometimes, short circuit of the display.

In the case of microcup-based electrophoretic displays, incorporation of conductive filler particles into the composition of the microcup structure or the electrode protecting layer(s) tends to cause problems in the manufacture of the microcups. Defective microcups may be resulted from insufficient or non-uniform degree of photoexposure during the microcup forming process (e.g., microembossing or photolithographic exposure). Moreover, if the particle size of the filler particles is relatively large as compared to the degree of surface roughness or thickness of the layer comprising the particles, damage on the embossing shim or the conductor film (such as ITO/PET) during embossing may be observed, particularly when the hardness of the conductive filler is higher than that of the shim material or conductor film used.

Low resistance fillers (such as metal oxides and polyether block amide elastomers), in the past, have been added into a polymer composition to form an interconnecting or percolation network in order to reduce the volume resistivity of the polymer structure formed from such a polymer composition. However, the interconnecting or percolation network in this approach is always a two-phase system, with the low resistance filler as the dispersed phase. Optically, the two-phase system often causes a change of the appearance of the polymer structure, such as increased opacity. If the low resistance filler is not well dispersed, the polymer structure formed will show a dark color. Furthermore, a system based on a percolation network often requires the loading of the low resistance filler to be over, but still close to, the percolation threshold, at which stage the filler particles are close enough to touch each other but still not enough to dominate the resistance of the system. As a result, the resistance of the system undergoes a sharp transition from the resistance of the continuous phase to that of the dispersed phase. In practice, formulating such a system to achieve an exactly desired level of electrical property with consistency can be difficult because the success of the system would depend on a variety of factors, such as the aggregation structure and exact loading of the filler particles and the amount of impurity that comes with the filler material.

SUMMARY OF THE INVENTION

The present invention relates to compositions of display cell structure and/or electrode protecting layer(s) for improving the performance of a display device.

More specifically, it has been found that the performance of an electrophoretic display may be improved by forming the display cell structure and/or electrode protecting layer(s) from a composition comprising a polar oligomeric or polymeric material. Such a polar oligomeric or polymeric material in general have at least one of the polar functional groups selected from the group consisting of: nitro ($-NO_2$); hydroxyl ($-OH$); carboxyl ($-COO$); alkoxy ($-OR$ wherein R is an alkyl group); halo (e.g., fluoro, chloro, bromo or iodo); cyano ($-CN$); sulfonate ($-SO_3$); amino containing or amino-derived polar groups (amino, pyridine, quatanary ammonium, amide, lactam, caprolactam, hydrazone, imidazole, imine, pyridone, carbamate, dithiocarbamate, urea, oxazoline, oxime, indole, glucosamine, and the like); phosphorus containing polar groups (phosphate, phosphonium and the like); carbohydrate or saccharide type polar groups (furanose, pyranose, glucose, glucosamine and the like); sulfur containing polar groups such as thio ($-SH$) and the like; and anions such as zirconate, titanate and the like. Preferred polar functional groups are hydroxyl, carboxy, amino containing or amino-derived groups and carbohydrate groups. The more preferred functional groups are hydroxyl, carboxy, lactam, caprolactam, carbamate, and urea.

The polar oligomeric or polymeric material preferably is compatible with other components in the composition and can be easily processed by simple mixing.

The glass transition temperature of the polar oligomeric or polymeric material is preferably below about 100° C. and more preferably below about 60° C. It is noted that for a polar oligomeric material, the glass transition temperature referred to is the glass transition temperature of the material, after processing such as solvent evaporation, curing or the like.

The display cell structure and the electrode protecting layer(s) formed from the composition preferably has an average crosslinking density of below about 1 crosslink point per 80 Dalton molecular weight and more preferably below about 1 crosslink point per 120 Dalton molecular weight.

The concentration of the polar oligomeric or polymeric material may be no less than about 1%, preferably no less than about 3% and most preferably no less than about 10%, by weight in the composition.

With such a composition, the display cell structure and/or the electrode protecting layer(s) having an intended resistivity of about $1/1000$ to about 100 times of that of the electrophoretic fluid may be achieved.

The resistivity of the display cell structure and/or the electrode protecting layer(s) may be in the range of about $10^7$ to about $10^{12}$ ohm cm, thus providing good electric insulation properties.

The first aspect of the present invention is directed to a composition as described above for the formation of display cell structure and/or electrode protecting layer(s).

The second aspect of the invention is directed to a method for improving the performance of an electrophoretic display which method comprises forming display cell structure and/or electrode protecting layer(s) from a composition as described above.

The third aspect of the invention is directed to an electrophoretic display which comprises display cell structure and/or electrode protecting layer(s) formed from a composition as described above.

The present invention provides a solution to the problems outlined in the Background section of the application. First of all, the present invention involves a one phase system to produce a clear display cell structure and/or the electrode protecting layer(s). The resistance of the display cell structure and/or the electrode protecting layer(s) has a linear relationship with the concentration of the polar oligomeric or polymeric material in the composition, thus ensuring reproducibility, consistency and ease of fine tuning the electrical resistance of the display cell structure and the electrode protecting layer(s) formed. Secondly, the electrical resistance of the display cell structure and/or the electrode protecting layer(s) may be controlled to be in the same range or lower than that of the electrophoretic fluid, thus eliminating the reverse bias problem and increasing the effectiveness of the voltage applied. The present invention, furthermore, is superior over other approaches, including the pre-drive waveform approach, to eliminate reverse bias as it is batch-consistent which results in higher process tolerance during manufacture. Without reverse bias, much simpler driving waveform could be used to increase the display update rate. With higher effective voltage, high switching rate can also be achieved. More importantly, the composition of the present invention is easy to compound and is suitable for a wide variety of display applications.

DETAILED DESCRIPTION OF THE INVENTION

Definitions

Figure 1:
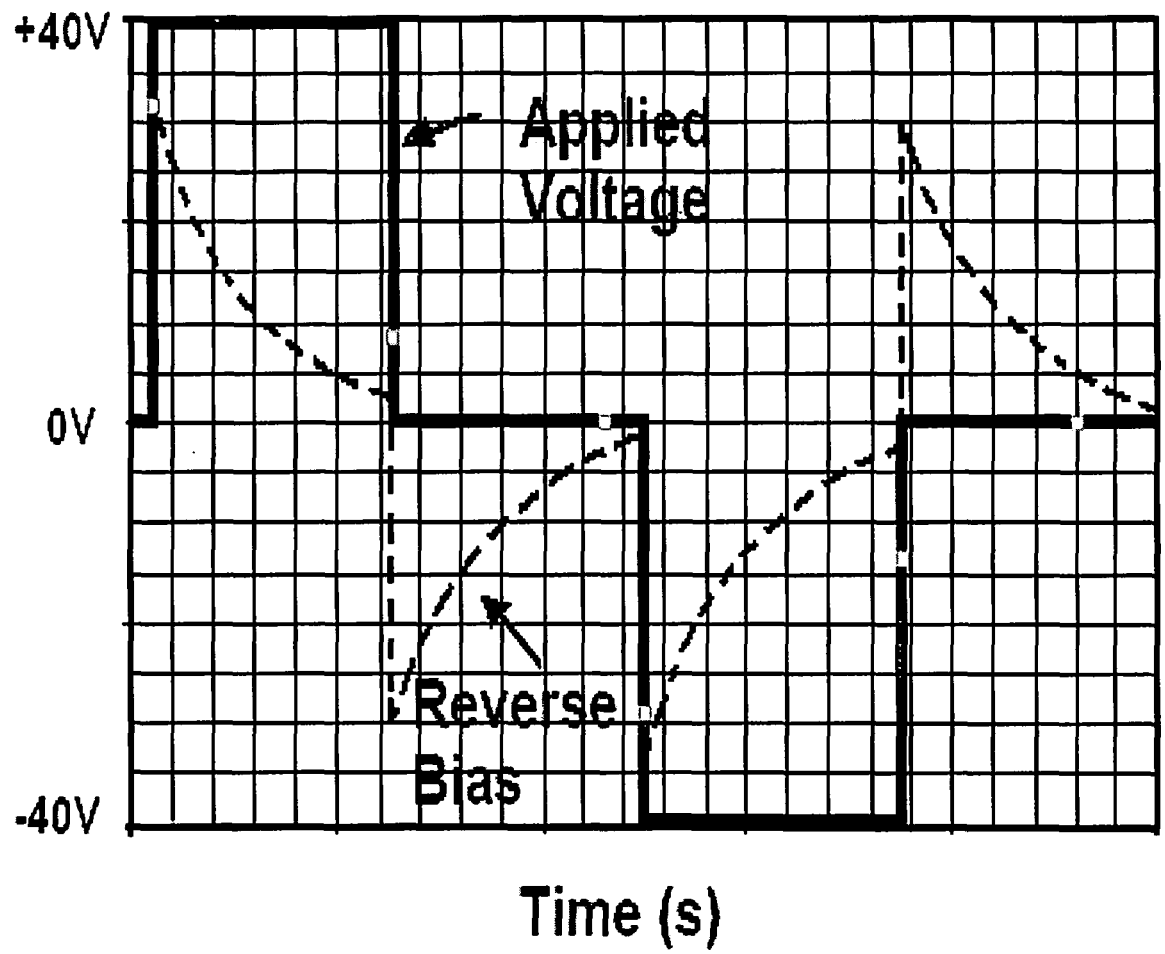
FIG. 1 illustrates the reverse bias phenomenon.

Unless defined otherwise in this specification, all technical terms are used herein according to their conventional definitions as they are commonly used and understood by those of ordinary skill in the art.

The term "microcup" refers to the cup-like indentations which may be created by methods such as microembossing or a photolithographic process as described in U.S. Ser. No.

09/518,488 (now U.S. Pat. No. 6,930,818), the content of which is incorporated herein by reference in its entirely.

While the term "microcup" is used to illustrate the specific embodiments of the present invention, it is understood that present invention is applicable to all types of electrophoretic display cells, including, but not limited to, the microcup-based display cells, the partition type display cells (see M. A. Hopper and V. Novotny, *IEEE Trans. Electr. Dev.*, 26(8): 1148-1152 (1979)), the microcapsule type display cells (U.S. Pat. Nos. 5,961,804 and 5,930,026) and the microchannel type display cells (U.S. Pat. No. 3,612,758).

Furthermore, the usefulness of the present invention is not limited to electrophoretic displays. The invention is also applicable to the display cell structures and/or electrode protecting layer(s) of other types of display device as long as the display device has a dielectric layer in the electrical pathway and lowering the resistance of the dielectric layer could improve the performance of the display device. Examples of such display devices include liquid crystal displays.

While the term "primer layer" or "tie layer" is referred to in some of the specific embodiments of the invention, it is also understood that the invention is applicable to not only the primer layer or tie layer specifically referred to but also the sealing layer, adhesive layer, insulation layer, substrate layer or other comparable dielectric layers in a display device. All of these layers are collectively referred to as the "electrode protecting layers" or the "dielectric layers" in the application.

The term "and/or" referred to in the expression, such as "display cell structure and/or electrode protecting layer(s)", is intended to mean that a particular feature described would apply to the display cell structure or the electrode protecting layer(s) individually or would apply to both.

The term "electrode protecting layer(s) is intended to mean that a particular feature would apply to one or more of the electrode protecting layers. This definition also applies to expression, such as "dielectric layer(s)".

The term "Dmax" refers to the maximum achievable optical density of a display.

The term "Dmin" refers to the minimum achievable optical density of a display.

The term "contrast ratio" refers to the ratio of the reflectance (% of light reflected) of the Dmin state to the reflectance of the Dmax state.

The term "low resistance" refers to resistivity no greater than 100 times of that of the electrophoretic fluid or refers to resistivity below $10^{12}$ ohm cm. The low resistivity is a permanent bulk property.

Figure 2A:
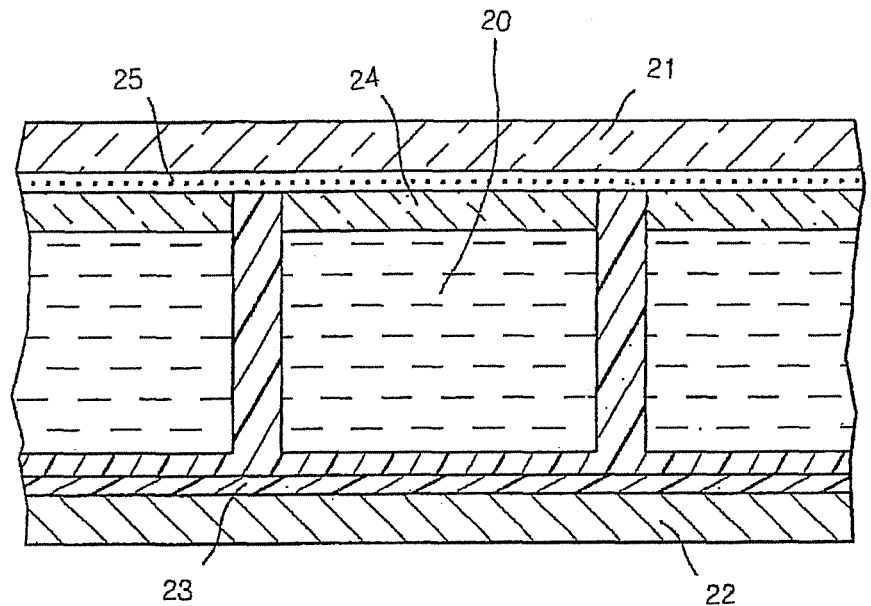
FIGS. 2A and 2B are schematic depiction of an electrophoretic display cell prepared by the microcup technology.
Figure 2B:
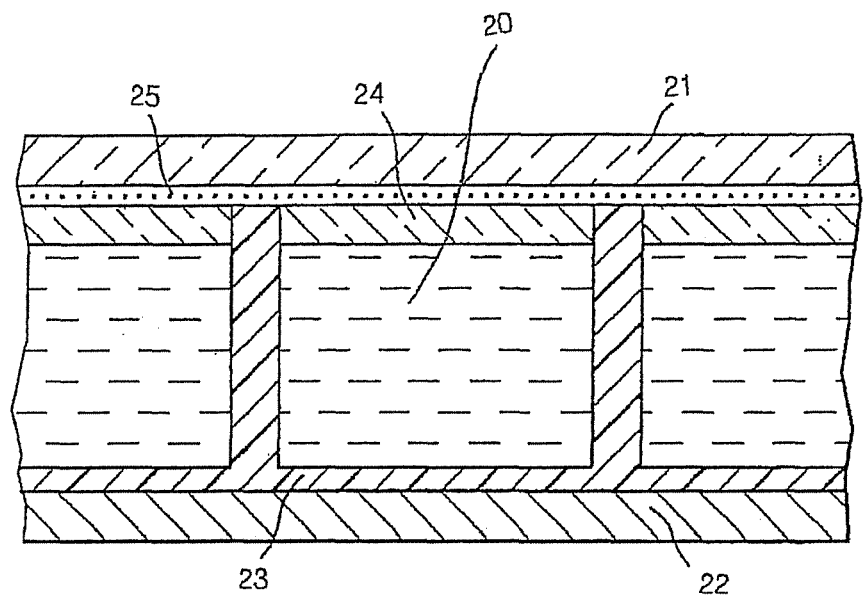

FIGS. 2A and 2B depict typical display cells prepared by the microcup technology as disclosed in WO01/67170. The microcup-based display cell (20) is sandwiched between a first electrode layer (21) and a second electrode layer (22).

A thin layer (23) is optionally present between the display cell (20) and the second electrode layer (22) as seen in the figures. The thin layer (23) may be a primer layer which is useful for improving the adhesion between the display cells and the second electrode layer (22). Alternatively the layer (23) may be a thin layer of the display cell material (as shown in FIG. 2B) if the display cells are prepared by an embossing process.

The thickness of the primer layer is usually in the range of about 0.1 to about 5 microns, preferably about 0.1 to about 1 micron.

The display cell (20) is filled with an electrophoretic fluid and sealed with a sealing layer (24) on the open side of the display cells. The first electrode layer (21) is laminated onto the sealed display cell, preferably with an adhesive layer (25).

In one embodiment, the microcup-based electrophoretic display may be viewed from the first electrode layer (21). In this case, the first electrode layer (21), the sealing layer (24) and the optional adhesive layer (25) must be transparent. In another embodiment, the microcup-based electrophoretic display may be viewed from the second electrode layer (22). In that case, the second electrode layer (22), the primer layer (23) and the display cell layer must be transparent.

In case of in-plane switching EPDs, one of the electrode layers (21 or 22) is replaced with an insulating layer.

The display cell structure (e.g., microcups) may be prepared by microembossing or photolithography as disclosed in WO01/67170. In the microembossing process, an embossable display cell composition is coated onto the conductor side of the second electrode layer (22) and embossed under pressure to produce the microcup array. To improve the mold release property, the conductor layer may be pretreated with a thin primer layer (23) before coating the embossable composition to increase the adhesion between the electrode layer and the cell structure.

The display cell composition or the electrode protecting layer composition in general comprises a polar oligomeric or polymeric material. The polar oligomeric or polymeric material is a polar oligomeric or polymeric material comprising at least one polar functional groups selected from the group consisting of: nitro (—$NO_2$); hydroxyl (—OH); carboxyl (—COO); alkoxy (—OR wherein R is an alkyl group); halo (e.g., fluoro, chloro, bromo or iodo); cyano (—CN); sulfonate (—$SO_3$); amino containing or amino-derived polar groups (amino, pyridine, quatanary ammonium, amide, lactam, caprolactam, hydrazone, imidazole, imine, pyridone, carbamate, dithiocarbamate, urea, oxazoline, oxime, indole, glucosamine, and the like); phosphorus containing polar groups (phosphate, phosphonium and the like); carbohydrate or saccharide type polar groups (furanose, pyranose, glucose, glucosamine and the like); sulfur containing polar groups such as thio (—SH) and the like; and anions such as zirconate, titanate and the like. Preferred polar functional groups are hydroxyl, carboxy, amino containing or amino-derived groups and carbohydrate groups. The more preferred functional groups are hydroxyl, carboxy, lactam, caprolactam, carbamate, and urea.

The glass transition temperature of the polar polymer material is preferably below about 100° C. and more preferably below about 60° C.

The display cell structure and the electrode protecting layer(s) formed from the composition preferably have an average crosslinking density of below about 1 crosslink point per 80 Dalton molecular weight and more preferably below about 1 crosslink point per 120 Dalton molecular weight. The suitable crosslinking density can be achieved by incorporating polar oligomeric or polymeric materials of different functional molecular weights in the composition. For example, a polar oligomeric or polymeric material having a relatively high functional molecular weight may be blended with another polar oligomeric or polymeric material having a low functional molecular weight to achieve a desired crosslinking density.

Examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

The polar oligomeric or polymeric material is compatible with other components in the composition and can be easily processed by simple mixing.

The weight percentage of the polar oligomeric or polymeric material in the composition may be no less than about 1%, preferably no less than about 3% and most preferably no less than about 10%.

With such a composition, the display cell structure and/or the electrode protecting layer(s) having an intended resistivity of about 1/1000 to about 100 times that of the electrophoretic fluid may be achieved. The display cell structure and/or the electrode protecting layer(s) may have an intended resistivity of about $10^7$ to about $10^{12}$ ohm cm. In practice, the thicker the bottom of the microcup structure is, the lower electrical resistivity is required.

In the embossable composition of the present invention, multi-functional monomers or oligomers may also be added in order to ensure acceptable crosslinking density and good mechanical strength of the microcups. This is particularly important for releasing of the mold during embossing and the mechanical property of the display cell structure. Such multi-functional monomers and oligomers with a reasonably high glass transition temperature can be used to compensate the low glass transition temperature of the polar oligomeric or polymeric material in the embossable composition in order to achieve required mechanical property and surface property and ensure the lifetime of the display cell structure. Useful multifunctional monomers and oligomers include, but are not limited to, 1,6-hexanediol diacrylate (HDDA, supplied by UCB), pentafunctional monomer (SR399, Sartomer Company), urethane diacrylate (CN983, Sartomer Company), polyester hexa-acrylate (EB830, UCB) and the like. Usually more than 10% of such multifunctional monomers or oligomers may be added into the composition.

Optionally, a release agent is added in the embossable composition to ensure good mold releasing during or after embossing. Such releasing agents may include, but are not limited to, silicon functionalized small molecules, oligomers and polymers, such as silicon surfactants (e.g., Silwet), silicon acrylates or the like, preferably at a concentration of about 0.01% to about 5%.

The composition of the primer layer, if present, is at least partially compatible with the embossing composition or the microcup material after curing. In practice, it may be the same as the embossable composition. Therefore the primer layer (23) of the display may also be formed from a composition as described above for the display cell structure.

Optionally, an adhesion promoter can be added in the primer layer composition to ensure good adhesion to the conductive substrate and the microcup structure. Such adhesion promoters may include, but are not limited to, carboxylated acrylates, hydroxylated acrylate, metal acrylates and the like, preferably at a concentration of about 0.1% to about 15%.

Optionally, a photo-initiator for UV curing may also be added in the primer layer and/or embossable composition, if UV curing process is desired.

The embossable composition is formulated preferably without a solvent. However, a solvent, such as MEK or the like, at a concentration of less than about 5% may be used.

The solids are first mixed with the liquid components in the composition for the solid components to completely dissolve. A solvent may be added, if necessary. Sonication may be used to facilitate the dissolution of the solid components.

The microembossing process is typically carried out at a temperature higher than the glass transition temperature of the embossable composition. A heated male mold or a heated housing against which the mold presses may be used to control the microembossing temperature and pressure.

The mold is released during or after the embossable composition is hardened to reveal an array of microcups (20). The hardening of the embossable composition may be accomplished by mechanisms such as cooling, cross-linking by radiation or heat. If the hardening of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the pre-patterned male mold on to the embossable composition.

After the microcups are filled with an electrophoretic fluid, they may be sealed by any of the methods disclosed in U.S. Ser. No. 09/518,488, the content of which is incorporated herein by reference in its entirety. Briefly, the microcup-based cells filled with the electrophoretic fluid are sealed with a polymeric sealing layer and the polymeric sealing layer may be formed from a sealing composition. The sealing composition may be the same as the embossable composition described above for the display cell structure. The sealing composition is preferably having a specific gravity lower than that of the electrophoretic fluid. It is also preferably not miscible with the electrophoretic fluid.

In one method, the sealing is accomplished by dispersing the sealing composition in the electrophoretic fluid before filling and after filling, the sealing composition forms a supernatant layer on top of the electrophoretic fluid, after which, the polymeric sealing layer is hardened by solvent evaporation, interfacial reaction, moisture, heat, radiation or a combination of some of these curing mechanisms. In another method, the sealing is accomplished by overcoating the electrophoretic fluid with the sealing composition and the sealing is then accomplished by hardening the sealing composition by solvent evaporation, interfacial reaction, moisture, heat, radiation or a combination of some of these curing mechanisms. In both methods, the polymeric sealing layer is hardened in situ.

The sealed microcups finally are then laminated with the first electrode layer (21) which may be pre-coated with an adhesive layer (25). It is noted that the composition of the present invention may also be used to form the adhesive layer.

The composition of the present invention is also useful for a tie layer in a display device. The term, "tie layer", refers to a layer which is printed, coated or laminated over a backplane. The backplane may be a printed circuit board (PCB), flexible printed circuit (FPC), thin film transistor (TFT) backplane, flexible printed electronic backplane or the like. Presently, before a display panel is integrated with a backplane, the backplane must first be treated to ensure a smooth surface so that the display panel may be tightly and securely laminated onto the backplane. In order to create a smooth backplane surface, the gaps or crevices on the surface of the backplane are usually filled with a material such as poly (epoxy) or a photoresist. In some cases, grinding is also needed. These steps are not only costly but also labor intensive.

These steps, however, could be completely eliminated by using the present invention. For example, a smooth backplane surface may be accomplished by printing or coating a composition of the present invention over the uneven backplane surface, followed by curing the composition. A release layer may be placed (preferably with pressure) over the coated composition before curing to ensure an even distribution of the composition on the backplane surface and the release layer is removed after curing.

The tie layer serves as an extra dielectric layer in between the two driving electrodes. Because this extra layer is of low electrical resistance, it prevents loss or reduction of the effective voltage on the electrophoretic dispersion. Furthermore, a low resistance material can widen the coating thickness tolerance and thus also the process window.

In addition, the composition in the form of a liquid (before curing) may reach deep gaps or small crevices on the surface of the backplane. This feature, in combination with the low resistivity, allows the electrical field created by the adjacent electrodes to reach the electrophoretic dispersion right above the filled gaps. As a result, the switching performance of the gap areas could be similar to that of the areas with segment electrodes. Since the gap areas are no longer inactive during switching, sharper and cleaner images can be achieved.

It is also possible to laminate a layer of the cured composition over the surface of the backplane.

The tie layer may have a thickness of up to 15 um, preferably up to 10 um.

The composition of the present invention may also be colored. The color may be achieved by dissolving or dispersing a pigment or dye in the composition. In the case of a tie layer, the composition of different colors may be applied to the surface of the backplane in different areas as desired. Alternatively, layers of cured compositions of different colors may be laminated onto different areas.

EXAMPLES

The following examples are given to enable those skilled in the art to more clearly understand and to practice the present invention. They should not be considered as limiting the scope of the invention, but merely as being illustrative and representative thereof.

Preparation 1

Synthesis of a Reactive Protective Colloid $R_f$-Amine

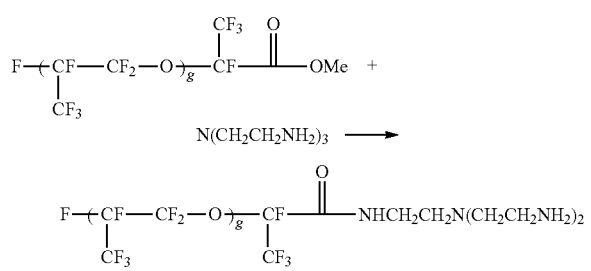

17.8 Grams of Krytox® methyl ester (DuPont, MW=about 1780, g=about 10) was dissolved in a solvent mixture containing 12 g of 1,1,2-trichlorotrifluoroethane (Aldrich) and 1.5 g of α,α,α-trifluorotoluene (Aldrich). The resultant solution was added drop by drop into a solution containing 7.3 g of tris(2-aminoethyl)amine (Aldrich) in 2 gm of α,α,α-trifluorotoluene and 30 g of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for the methyl ester at 1780 cm$^{-1}$ and the appearance of C=O vibration for the amide product at 1695 cm$^{-1}$. Solvents were removed by rotary evaporation followed by vacuum stripping at 100° C. for 4-6 hours. The crude product was then dissolved in 50 ml of the PFS2 solvent (perfluoropolyether from Solvay Solexis) and extracted with 20 ml of ethyl acetate three times, then dried to yield 17 g of purified product ($R_f$-amine-1900) which showed excellent solubility in HT200.

Other reactive $R_f$ amines having different molecular weights such as $R_f$-amine-4900 (g=about 30), $R_f$-amine-2000 (g=about 11), $R_f$-amine-800 (g=about 4) and $R_f$-amine-650 (g=about 3) were also synthesized according to the same procedure. $R_f$-amine-350 was also prepared by the same procedure, except that the Krytox® methyl ester was replaced by $CF_3CF_2CF_2COOCH_3$ (from SynQuest Labs, Alachua, Fla.).

Preparation 2

Microencapsulation of Pigment in HT200

8.93 Grams of Desmodur® N3400 aliphatic polyisocyanate (from Bayer AG) was dissolved in 4.75 g of acetone (99.9%, from Burdick & Jackson) and homogenized for 10 seconds with a rotor-stator homogenizer (IKA ULTRA-TURRAX T25, IKA WORKS) at ambient temperature. To the resultant solution, 13.61 g of $TiO_2$ (R706, from DuPont) was added and homogenized for 2 minutes. To the resultant $TiO_2$ dispersion, a solution containing 1.42 g of 1,5-pentanediol (BASF), 0.30 g of triethanolamine (99%, Dow), 2.75 g of polypropylene oxide (MW=725, from Aldrich) and 1.25 g of acetone was added and homogenized for 30 seconds. 0.37 Grams of a 2% dibutyltin dilaurate (Aldrich) solution in acetone was then added and homogenized for 1 minute and 30 seconds. In the final step, 50 g of HT-200 (Solvay Solexis) containing 2.25 g of $R_f$-amine-4900 (prepared according to Preparation 1 above) was added and homogenized for 4 minutes. The resultant microparticle dispersion was then heated at 80° C. overnight and stirred under low shear to post cure the microparticles.

An electrophoretic dispersion was prepared by adding 10% by weight of thus prepared microencapsulated $TiO_2$ particles and 3.3% by weight of a black dye in HT-200.

Example 1

I. Preparation of a Primer Layer Coated Conductor Film

A primer solution containing 4.004 g of Irostic S 9815-18 polyurethane (Huntsman, Auburn Hills, Mich.), 0.554 g of BDE 1025 dendritic polyester acrylate oligomer (Bomar Specialties Co, Winsted, Conn.), 0.25 g of CD9050 monofunctional acid ester (Sartomer Company, Inc, Exton, Pa.), 0.096 g of photoinitiator Sarcure SR1124 or ITX (Sartomer), 0.096 g of photoinitiator Irgacure 369 (Ciba Specialty Chemicals, Tarrytown, N.Y.), 45 g of 2-butanone (Aldrich, Milwaukee, Wis.), 40 g of n-Butyl acetate (Aldrich) and 10 g of cyclohexanone (Aldrich) was mixed until all the ingredients were completely dissolved.

The primer solution thus prepared was coated on a 3 mils or 5 mils ITO/PET film (CPFilms Inc, Martinsville, Va.) by a T#3 drawdown bar. The coated ITO film was dried in an 80° C. oven for 10 minutes, then cooled down or exposed to a minimum UV dosage to cause hardening of the coating surface.

II. Preparation of Microcups on the Primer Layer Coated Conductor Film

A microcup solution containing 10.5 g of ethoxylated pentaerythritol tetraacrylate SR494 (Sartomer Company, Inc, Exton, Pa.), 21.65 g of ethoxylated trimethylolpropane triacrylate SR502 (Sartomer), 10.5 g of polyester hexaacrylate Ebecryl 830 (UCB Chemicals, Smyrna, Ga.), 4.93 g of amine acrylate CN373 (Sartomer), 0.7 g of photoinitiator Sarcure SR1124 (ITX, Sartomer), 0.1 g of photoinitiator Irgacure 369 (Ciba Specialty Chemicals, Tarrytown, N.Y.), 0.12 g of photoinitiator Chivacure BMS (Chitec Chemical Co, Taiwan, China), 1.5 g of polyether siloxane copolymer Silwet L-7210 (GE Silicone) and 1.5 g of silicon acrylate Tego Rad 2200N was mixed thoroughly on a 2-Tier Jar Mill with a 13" roll face (US Stoneware, Inc.) until all of the ingredients were completely dissolved. The microcup solution thus prepared was debubbled in an ultrasonic tank for 1 hour.

The microcup solution was slowly coated onto an 8"×8" electroformed Ni male mold for an array of 110 μm (length)×110 μm (width)×25 μm (depth)×11 μm (width of the top surface of the partition wall between microcups) microcups. A plastic blade was used to remove excess of fluid and gently squeeze it into "valleys" of the Ni mold. The coated Ni mold was heated in an oven at 65° C. for 5 minutes and laminated with the primer layer coated ITO/PET film prepared in Step I above, with the primer layer facing the Ni mold, using a Hot Roll Laminator (Chem Instrument, Fairfield, Ohio) preset at a roller temperature of 250° F. and lamination speed of 1 cm/sec. The roll pressure was set at 80 psi. A Model LS-218CB Longwave/Shortwave UV lamp without filter glass was used to cure the panel as soon as the sample was rolled out from the laminator. The ITO/PET film was then peeled off from the Ni mold at a peeling angle of about 30 degree to produce a 8"×8" microcup array on the ITO/PET. An acceptable release of the microcup array from the mold was observed. The thus obtained microcup array was further post-cured with a UV conveyor (D bulb) curing system (DDU, Los Angles, Calif.) with a UV dosage of 1.0 J/cm².

III. Filling and Sealing the Microcups

An electrophoretic fluid prepared from Preparation 2 was filled into the microcups prepared from Step II above using a #0 drawdown bar. The filled microcups were then overcoated with a top-sealing/adhesive solution consisting of 11.9 parts (dry) by weight of polyurethane Irostic S-9815-15 (Huntsman, Auburn Hills, Mich.), 2.1 parts by weight of urethane diacrylate CN983 (Sartomer Company, Inc, Exton, Pa.), 0.1 parts by weight of photoinitiator Irgacure 907 (Ciba Specialty Chemicals, Tarrytown, N.Y.), 40.8 parts by weight of MEK, 40.8 parts by weight of IPAc and 4.3 parts by weight of CHO (cyclohexanone) with a doctor blade. The sealing layer was air-dried for 1 minute and heated in an 80° C. oven for 2 minutes to form a seamless sealing layer on the filled microcups. The top-sealed microcups were laminated directly onto a 5 mil ITO/PET film by a laminator at 120° C. at a linear speed of 20 cm/min. After lamination, the sample was further UV cured by passing through a UV conveyer twice at the speed of 10 ft/min with a UV intensity of 2.56 W/cm² (which is equivalent to 0.856 J/cm²).

IV. Testing

Figure 3:
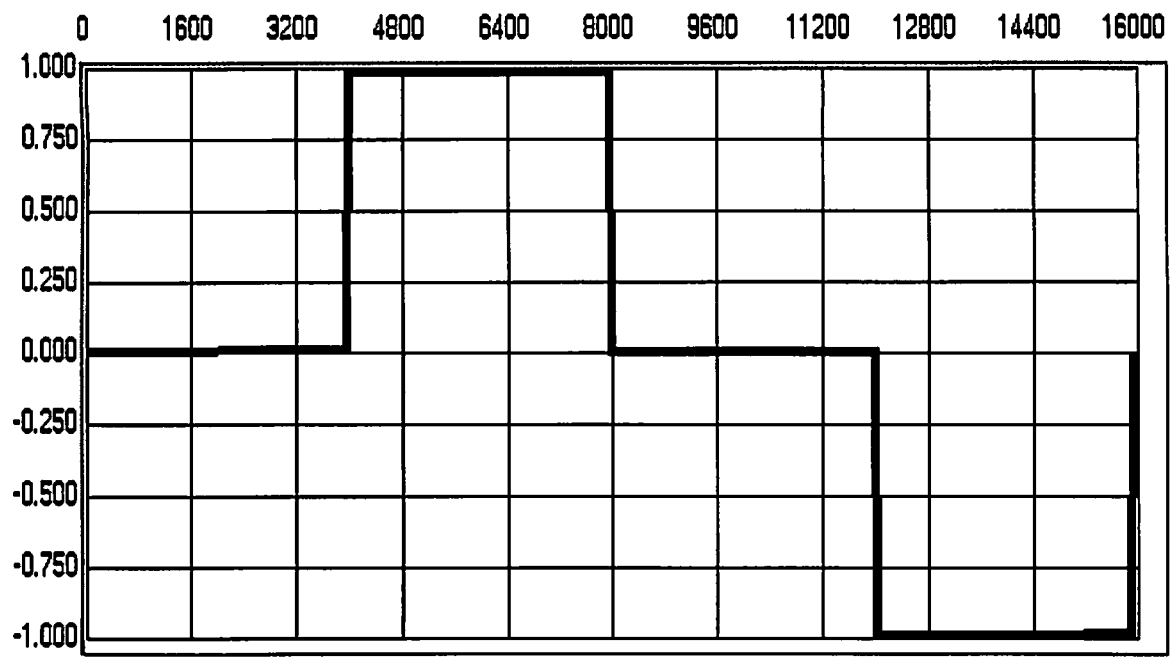
FIG. 3 shows the driving waveform (20V and 0.1 Hz) used in the examples.
Figure 4:
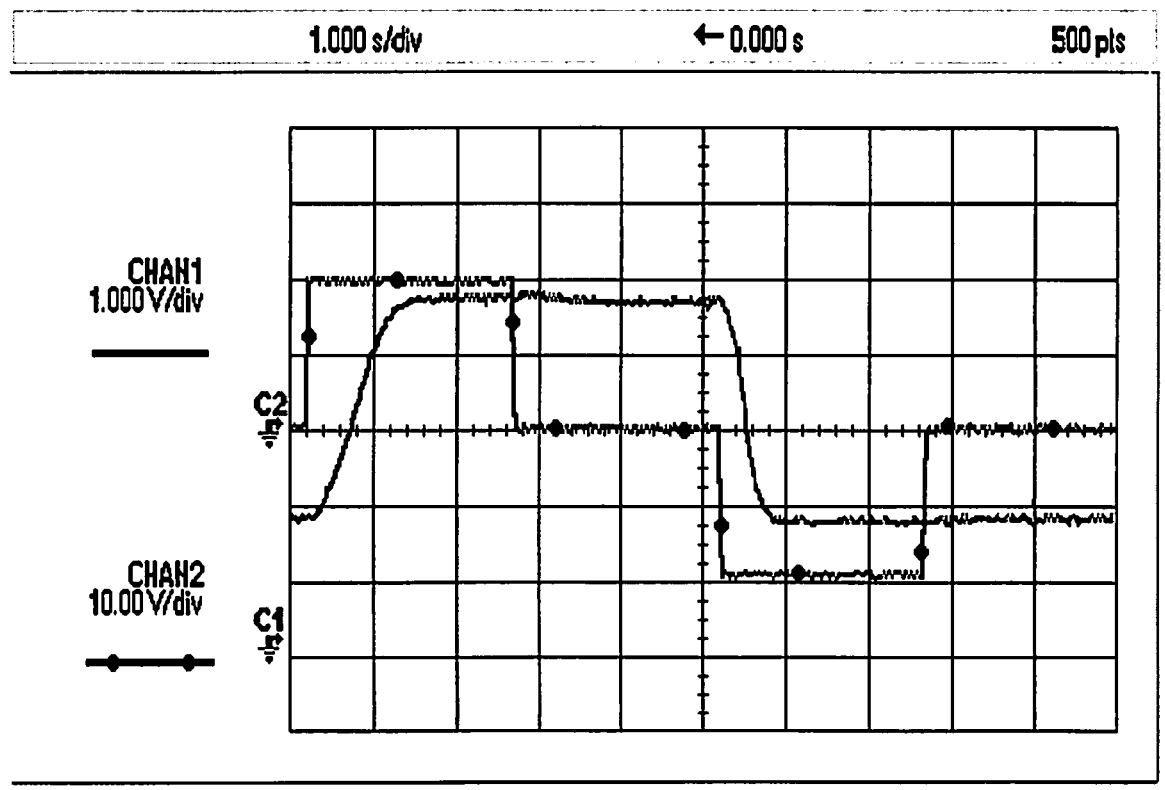
FIG. 4 shows absence of reverse bias with the EPD sample of Example 1.

The integrated EPD sample prepared was subjected to a 20V and 0.1 Hz reverse bias waveform (see FIG. 3) and no reverse bias was detected (see FIG. 4). FIG. 4 shows the optical response of the sample under square wave driving at 20V.

Example 2

The procedure of Example 1 was followed, except that SR9035 was replaced with SR502 in the microcup solution.

The integrated EPD sample obtained was subjected to the same 20V and 0.1 Hz reverse bias waveform as shown in FIG. 3. In this case, there was also no reverse bias detected.

All of the microcup films prepared in Examples 1 and 2 showed excellent mechanical strength and good adhesion to the conductor substrate.

Example 3

Comparative Example

The procedure of Example 1 was followed, except that the primer layer solution and the microcup solution were replaced. The primer layer and microcup solutions were prepared as follows:

Primer Layer Solution:

A primer solution containing 1.42 g of Irostic S 9815-18 polyurethane (Huntsman, Auburn Hills, Mich.), 2.22 g of CN983 polyurethane acrylate oligomer (Sartomer Company, Inc, Exton, Pa.), 1.11 g of Eb1290 hexafunctional polyurethane (UCB Chemicals, Smyrna, Ga.), 0.12 g of photoinitiator Sarcure SR1124 (ITX Sartomer), 0.12 g of photoinitiator Irgacure 369 (Ciba Specialty Chemicals, Tarrytown, N.Y.), 0.05 g of photoinitiator Irgacure 819 (Ciba Specialty Chemicals), 0.01 g of Irganox 1035 (Ciba Specialty Chemicals), 20 g of 2-butanone (Aldrich, Milwaukee, Wis.), 45 g of n-Butyl acetate (Aldrich) and 30 g of cyclohexanone (Aldrich) was mixed until all of the ingredients were completely dissolved.

Microcup Solution

A microcup solution containing 35.33 g of bisphenol A epoxy diacrylate Ebecryl 600 (UCB Chemicals, Smyrna, Ga.), 45.94 g of dipentaerythritol pentaacrylate SR399 (Sartomer Company, Inc, Exton, Pa.), 9.32 g of polyethylene glycol diacrylate SR610 (Sartomer), 6.38 g of silicone hexaacrylate Ebecryl 1360 (UCB Chemical), 0.13 g of photoinitiator Irgacure 819 (Ciba Specialty Chemicals, Tarrytown, N.Y.), 1.99 g of photoinitiator Irgacure 184 (Ciba Specialty Chemicals), 0.40 g of Irganox 1035 (Ciba Specialty Chemicals), 0.5 g of Tinuvin 770 (Ciba Specialty Chemicals) and 10 g of acetone (Aldrich, Milwaukee, Wis.) was mixed thoroughly on a 2-Tier Jar Mill with a 13" roll face (US Stoneware, Inc.) until all of the ingredients were completely dissolved. The microcup solution thus prepared was debubbled in an ultrasonic tank for 1 hour.

Figure 5:
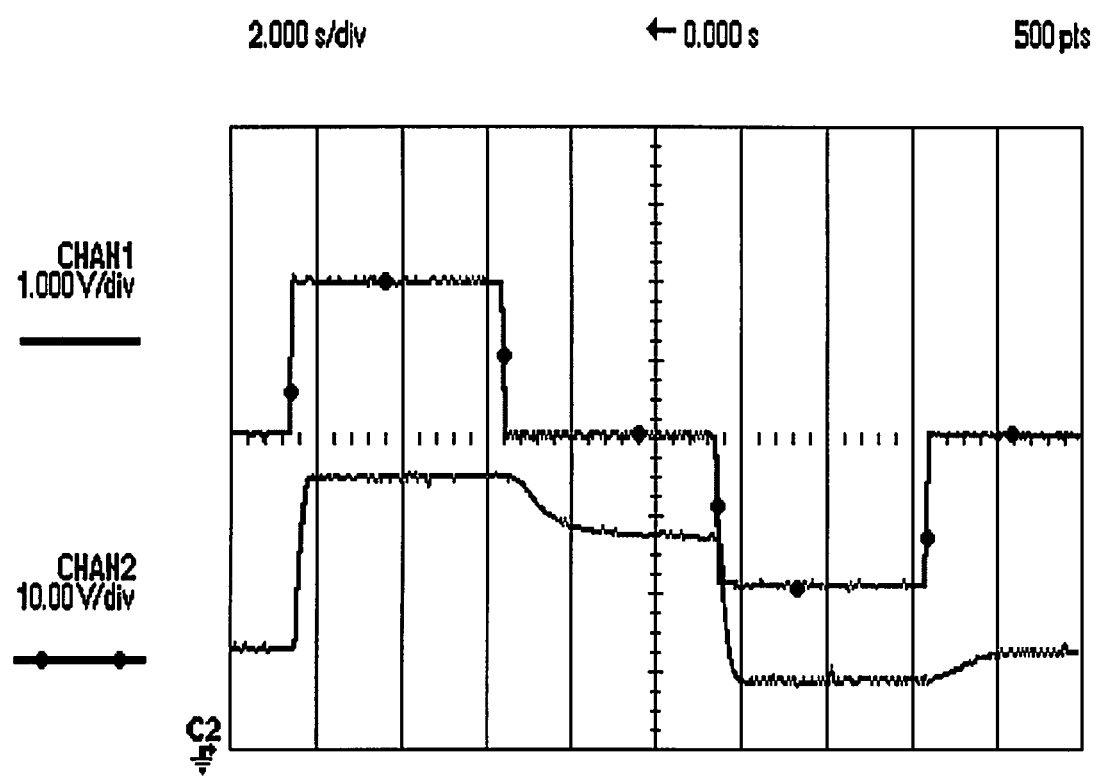
FIG. 5 shows reverse bias with the EPD sample of Example 3 (comparative example).

The integrated EPD sample obtained in this example was subjected to the same 20V and 0.1 Hz reverse bias waveform as shown in FIG. 3. In this case, severe reverse bias was detected (see FIG. 5). FIG. 5 shows the optical response of the sample under square wave driving at 20V.

Example 4

I. Preparation of a Tie Layer Coated Printed Circuit Board (PCB)

A tie layer formulation was prepared by mixing 10.0 g of SR415 (ethoxylated (20) trimethylolpropane triacrylate, Sartomer Company, Inc) and 0.05 g of Irgacure 500 (mixture of 50% of benzophenone and 50% of 1-hydroxy-cyclohexyl-phenyl-ketone, Ciba Specialty Chemicals). The solid content and viscosity of the tie layer formulation were 100% and 225 centipoises at 25° C., respectively. The PCB board was cleaned with MEK and Isopropyl alcohol. On the PCB board, the gaps between two segment electrodes were measured to be 30-40 um deep and 150 um wide. The tie layer formulation was applied as a strip of a thick layer by syringe near one edge of the backplane. A UV50 release film (CPF films Inc.), was placed on top and laminated onto the backplane using a Roll Laminator (EAGLE 35 GBC) at a lamination speed of 5 fpm, at room temperature. The lamination direction is from the edge with the tie layer formulation to the opposite edge. A UV conveyer station with UV intensity of 0.8 J/cm$^2$ (H bulb) at a conveyer speed of 10 fpm was used to cure the tie layer. After curing, the UV50 release film was removed.

II. Preparation of EPD on the Tie Layer Coated PCB

The display panel with filled and sealed microcups as prepared in Example 1 was laminated on top of the tie layer coated PCB to form an integrated EPD panel.

III. Testing of EPD Performance with Comparative Examples

Contrast ratios using a 40V driving voltage at room temperature and 10° C. were measured to compare the tie layer coated and uncoated EPD panels. No difference was observed (see Table 1). At 10° C., a short pulse was used in order to switch to an intermediate response state for observation of any subtle difference in the switching performance of the EPD panels.

TABLE 1

Contrast Ratios of EPD with and without the Tie Layer at Room Temperature and 10° C.:

| | Sample | |
|---|---|---|
| | with tie layer | without tie layer |
| Room Temperature performance | | |
| Dmin | 0.63 | 0.64 |
| Dmax | 1.65 | 1.65 |
| Contrast ratio | 10.47 | 10.23 |
| 10 C. performance | | |
| Dmin | 0.72 | 0.72 |
| Dmax | 1.37 | 1.37 |
| Contrast ratio | 4.47 | 4.47 |

The effect of the tie layer thickness was also studied. Results showed that EPD panels with a tie layer having a thickness of up to 9-10 um had similar contrast ratios (40 V) at room temperature and 10° C. to those without the tie layer (see Table 2).

TABLE 2

Effect of Different Thickness of the Tie Layer on Contrast Ratios of the EPD:

| | Tie layer thickness | | | | |
|---|---|---|---|---|---|
| | 9-10 um | 6-7 um | 4-5 um | 2-3 um | control |
| Room Temperature performance | | | | | |
| Dmin | 0.64 | 0.65 | 0.65 | 0.65 | 0.64 |
| Dmax | 1.7 | 1.69 | 1.68 | 1.69 | 1.68 |
| Contrast ratio | 11.48 | 10.96 | 10.72 | 10.96 | 10.96 |
| 10 C. performance | | | | | |
| Dmin | 0.74 | 0.75 | 0.75 | 0.75 | 0.75 |
| Dmax | 1.39 | 1.41 | 1.4 | 1.41 | 1.44 |
| Contrast ratio | 4.47 | 4.57 | 4.47 | 4.57 | 4.90 |

On the bare PCB backed EPD, the gaps between two segment electrodes were inactive during driving, the gaps were clearly visible during switching and on the switched image. The segment gaps were substantially eliminated with the addition of the tie layer on the PCB board. The segment gaps showed similar switching performance as the adjacent segments, due to the low resistivity of the tie layer filled in the segment gaps. Also, no cross talk was observed under different switching conditions, such as at different temperatures and humidity.

While the present invention has been described with reference to the specific embodiments thereof, it should be understood by those skilled in the art, that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising display cells, electrodes, and electrode protecting layers, wherein the display cells or at least one of the electrode protecting layers is formed from a composition comprising a polar oligomeric or polymeric material which comprises at least one polar group selected from the group consisting of nitro, hydroxyl, alkoxy, halo, cyano, sulfonate, amino containing or amino-derived polar groups, carbohydrate groups, phosphorus containing polar groups, sulfur containing polar groups, and anions; wherein said display cells or said electrode protecting layer have a resistivity in the range of about $10^7$ to about $10^{12}$ ohm cm.

2. The display device according to claim 1, wherein said polar group is a carbohydrate group or an amino containing or amino-derived polar group.

3. The display device according to claim 2, wherein said amino containing or amino-derived polar group is amino, pyridine, quatanary ammonium, amide, lactam, caprolactam, hydrazone, imidazole, imine, pyridone, carbamate, dithiocarbamate, urea, oxazoline, oxime, or indole.

4. The display device according to claim 2, wherein said carbohydrate group is furanose, pyranose, glucose, or glucosamine.

5. The display device of claim 1, wherein said electrode protecting layer is a primer layer.

6. The display device of claim 1, wherein said electrode protecting layer is a sealing layer.

7. The display device of claim 1, wherein said electrode protecting layer is an adhesive layer.

8. The display device of claim 1, wherein said electrode protecting layer is a tie layer.

9. The display device of claim 8, wherein said tie layer has areas of different colors.

10. The display device of claim 1, which is an electrophoretic display.

11. The display device of claim 10, wherein the display cells are microcups or microcapsules.

12. The display device of claim 1, which is a liquid crystal display.

13. A method for improving the performance of an electrophoretic display comprising:
 (i) forming a composition comprising a polar oligomeric or polymeric material which comprises at least one polar group selected from the group consisting of hydroxyl, carboxy, amino containing or amino-derived polar groups, carbohydrate groups, phosphorus containing polar groups, sulfur containing polar groups, and anions;
 (ii) forming display cells and forming an electrode protecting layer, wherein the display cells or the electrode protecting layer has an average crosslinking density of below about 1 crosslink point per 80 Dalton molecular weight from said composition; and (iii) filling said display cells with an electrophoretic fluid.

14. The display device according to claim 13, wherein said polar group is a carbohydrate group or an amino containing or amino-derived polar group.

15. The display device according to claim 14, wherein said amino containing or amino-derived polar group is amino, pyridine, quatanary ammonium, amide, lactam, caprolactam, hydrazone, imidazole, imine, pyridone, carbamate, dithiocarbamate, urea, oxazoline, oxime, or indole.

16. The display device according to claim 14, wherein said carbohydrate group is furanose, pyranose, glucose, or glucosamine.

17. A method for improving the performance of an electrophoretic display comprising:
(i) forming a composition comprising a polar oligomeric or polymeric material which comprises at least one polar group selected from the group consisting of amino containing or amino-derived polar groups, carbohydrate groups, phosphorus containing polar groups, sulfur containing polar groups, and anions; wherein the concentration of said polar oligomeric or polymeric material is no less than about 1% by weight;
(ii) forming display cells and forming an electrode protecting layer, wherein the display cells or the electrode protecting layer is formed from said composition; and
(iii) filling display cells with an electrophoretic fluid.

18. The display device according to claim 17, wherein said polar group is a carbohydrate group or an amino containing or amino-derived polar group.

19. The display device according to claim 18, wherein said amino containing or amino-derived polar group is amino, pyridine, quatanary ammonium, amide, lactam, caprolactam, hydrazone, imidazole, imine, pyridone, carbamate, dithiocarbamate, urea, oxazoline, oxime, or indole.

20. The method of claim 17, wherein said concentration is no less than about 3% by weight.

* * * * *